No. 704,430. Patented July 8, 1902.
F. H. BATES.
SPEED REGULATING AND REVERSING DEVICE FOR POWER TRANSMITTING MECHANISM.
(Application filed Jan. 19, 1901.)
(No Model.)
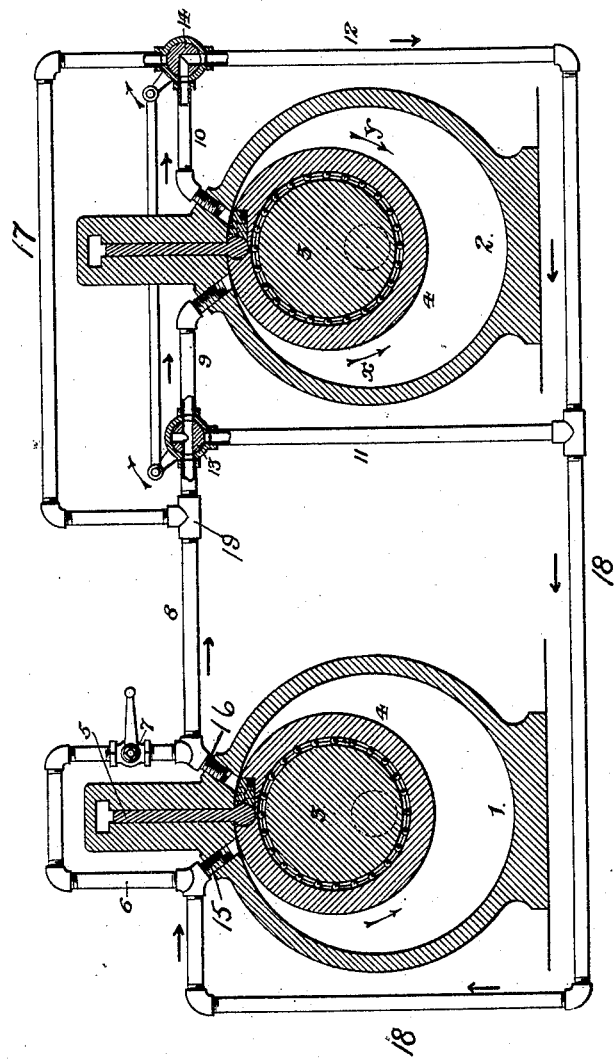
Witnesses:-
Louis M. F. Whitehead
Herman E. Metius
Inventor:-
Frank H. Bates.
by his Attorneys:
Howson & Howson

UNITED STATES PATENT OFFICE.

FRANK H. BATES, OF PHILADELPHIA, PENNSYLVANIA, ASSIGNOR, BY MESNE ASSIGNMENTS, TO WILLIAM WELCOME BATES, OF PHILADELPHIA, PENNSYLVANIA.

SPEED REGULATING AND REVERSING DEVICE FOR POWER-TRANSMITTING MECHANISM.

SPECIFICATION forming part of Letters Patent No. 704,430, dated July 8, 1902.

Application filed January 19, 1901. Serial No. 43,879. (No model.)

*To all whom it may concern:*

Be it known that I, FRANK H. BATES, a citizen of the United States, residing in Philadelphia, Pennsylvania, have invented certain Improvements in Speed Regulating and Reversing Devices for Power-Transmitting Mechanism, of which the following is a specification.

The object of my invention is to provide a readily-controllable speed regulating and reversing device intended principally for use in connection with motive-power apparatus having a gas-engine or other continuously-running motor as the prime mover, my improved device permitting of the starting, stopping, regulating, or reversal of the driven shaft while said prime mover is running continuously in one direction and at a uniform speed.

The figure in the accompanying drawing shows in diagrammatic form apparatus designed in accordance with my invention.

1 represents a rotary pump of any available type, hereinafter referred to as the "driving-engine," operated by or from the shaft of the gas-engine or other continuously and uniformly running prime mover, and 2 is a rotary motor, referred to as the "driven engine," operated by means of fluid derived from said pump 1 in the manner hereinafter set forth.

In the present instance both driving and driven engines are similar in character to the rotary engine forming the subject of my application for patent filed December 15, 1900, Serial No. 40,016, each comprising an eccentric 3, with surrounding ring 4, mounted by means of ball-bearings on said eccentric and having a rocking-joint connection with a sliding partition-plate 5, which is adapted to a chamber in a structure at one side of the cylinder and serves at all times to separate the inlet and exhaust sides of the cylinder.

There are branched pipes 15 and 16 leading from the inlet and exhaust sides of the cylinder of the driving-engine, and direct communication between these sides is established through a pipe 6, connected at one end to a branch of the pipe 15 and at the other to a branch of the pipe 16. This pipe 6 is provided with a valve 7 in its portion adjacent to the pipe 16. The cylinder of the driven engine also has its two sides provided with branched pipes 9 and 10, which will be hereinafter referred to as the "inlet" and "exhaust" pipes, respectively, although it is to be understood that when the driven engine is reversed the pipe 9 becomes the exhaust and the pipe 10 the inlet. The second branch of the exhaust-pipe 16 of the driving-engine is connected through a pipe 8 and a T 19 directly to a branch of the pipe 9, the other outlet of said T 19 communicating through a pipe 17 with one opening of a three-way valve 14, placed at the branching point of the pipe 10 from the driven engine. The second branch of this pipe 10 is connected through said valve and a pipe 12 with the second branch 18 of the inlet-pipe 15 of the driving-engine cylinder. There is also a three-way valve 13 placed in the pipe 9 between the point of its entrance into the cylinder of the driven engine and its point of branching, said valve having a straight through-passage connected to a branch of the T 19 in said pipe 9 and a second opening connected through a pipe 11 with the pipes 12 and 18.

In operation both of the cylinders 1 and 2 and all of the connecting-pipes are in the first instance charged with water, oil, glycerin, or other incompressible fluid body. Should now the valve 7 be fully open, the operation of the driving-engine will simply cause a circulation of the fluid through the pipe 6, this being the course of least resistance for the fluid to follow. If, however, the valve 7 is fully closed, the fluid in order to pass from the exhaust to the inlet side of the said engine 1 will be compelled to pass through the cylinder of the driven engine 2 and will therefore impart to the piston of said cylinder movement similar to that of the movement of the piston in the cylinder 1 if both cylinders are of the same dimensions or a movement faster or slower than that of the movement of the piston in the cylinder 1, as the cylinder 2 is smaller or larger than said cylinder 1.

Usually both cylinders 1 and 2 will be of the same size, and the speed of the piston in the cylinder 2 relatively to that of the piston in the cylinder 1 will be dependent upon the adjustment of the valve 7 in the pipe 6, for the less the obstruction to the free flow of fluid through the pipe 6 the less will be the proportionate volume of the fluid directed through the cylinder 2 and the slower will be the speed of movement of the piston in the latter cylinder in proportion to that of the piston in the cylinder 1.

The direction of movement of the piston in the cylinder 2 will be dependent upon the manipulation of the valves 13 and 14, which control the flow through the pipes 9, 10, 11, 12, and 17. For instance, if said valves 13 and 14 are adjusted as shown in the drawing the course of the fluid will be that indicated by the arrows and the piston in the cylinder 2 will rotate in the direction of the arrow $x$, while if the valves are moved for a quarter of a turn in the direction of the arrows, so as to change the direction of flow of the motive fluid, the piston in the cylinder 2 will rotate in the direction of the arrow $y$, the speed in either case being dependent upon the adjustment of the valve 7 in the pipe 6.

The valves 13 and 14 may be connected so as to be operated by a single handle, whereby reversal of direction of movement may be effected by manipulation of such single handle.

Other forms of engine than a rotary engine may, as will be evident, constitute the driving and the driven elements of the combination.

Having thus described my invention, I claim and desire to secure by Letters Patent—

1. The combination of a driving and a driven engine, a branched inlet and a branched exhaust pipe to each engine, a direct connection between a branch of the inlet and a branch of the exhaust pipes of the driving and also of the driven engine, a pipe connecting a branch of the inlet-pipe 15 of the driving-engine with a branch of the exhaust-pipe 10 of the driven engine, a pipe connecting a branch of the exhaust 16 of the driving-engine with a branch of the inlet 9 of the driven engine, and a pipe 11 connecting said two latter pipes, substantially as described.

2. The combination of a driving and a driven engine, a branched inlet and a branched exhaust pipe to each engine, a direct connection between a branch of the inlet and a branch of the exhaust pipes of the driving and also of the driven engine, a pipe connecting a branch of the inlet 15 of the driving-engine with a branch of the exhaust 10 of the driven engine, a pipe connecting a branch of the exhaust 16 of the driving-engine with a branch of the inlet 9 of the driven engine, and a pipe 11 connecting said two latter pipes, a valve in the inlet-pipe 9 of the driven engine having said pipe 11 connected to one of its openings, and a valve at the point of branching of the discharge-pipe of the driven engine, substantially as described.

3. The combination of a driving and a driven engine, a branched inlet and a branched exhaust pipe to each engine, a direct connection between a branch of the inlet and a branch of the exhaust pipes of the driving and also of the driven engine, a pipe connecting a branch of the inlet 15 of the driving-engine with a branch of the exhaust 10 of the driven engine, a pipe connecting a branch of the exhaust 16 of the driving-engine with a branch of the inlet 9 of the driven engine, and a pipe 11 connecting said two latter pipes, a valve in the inlet-pipe 9 of the driven engine having said pipe 11 connected to one of its openings, and a valve at the point of branching of the discharge-pipe of the driven engine, and means whereby said valves may be simultaneously operated, substantially as described.

4. The combination of a driving and a driven engine, a branched inlet and a branched exhaust pipe to each engine, a direct connection between a branch of the inlet and a branch of the exhaust pipes of the driving and also of the driven engine, a pipe connecting a branch of the inlet 15 of the driving-engine with a branch of the exhaust 10 of the driven engine, a pipe connecting a branch of the exhaust 16 of the driving-engine with a branch of the inlet 9 of the driven engine, and a pipe 11 connecting said two pipes, a valve in the inlet-pipe 9 of the driven engine and a second valve at the point of branching of the exhaust-pipe 10 of the driven engine, said first valve being constructed to permit the inlet 9 of the driven engine to communicate directly with its point of branching or with said pipe 11 at will and the second valve being constructed to connect the exhaust of the driven engine to either of its branches at will, substantially as described.

In testimony whereof I have signed my name to this specification in the presence of two subscribing witnesses.

FRANK H. BATES.

Witnesses:
F. E. BECHTOLD,
JOS. H. KLEIN.